(12) United States Patent
Kodila

(10) Patent No.: US 10,571,129 B2
(45) Date of Patent: Feb. 25, 2020

(54) METHOD AND APPARATUS FOR BURNING ITEMS

(71) Applicant: Mark A. Kodila, Metuchen, NJ (US)

(72) Inventor: Mark A. Kodila, Metuchen, NJ (US)

(*) Notice: Subject to any disclaimer, the term of this patent is extended or adjusted under 35 U.S.C. 154(b) by 144 days.

(21) Appl. No.: 15/701,616

(22) Filed: Sep. 12, 2017

(65) Prior Publication Data

US 2019/0078790 A1    Mar. 14, 2019

(51) Int. Cl.
*F24B 1/195*   (2006.01)
*B62B 1/26*    (2006.01)
*F24B 3/00*    (2006.01)

(52) U.S. Cl.
CPC .............. *F24B 1/195* (2013.01); *B62B 1/26* (2013.01); *F24B 3/00* (2013.01)

(58) Field of Classification Search
CPC .............. F24B 1/195; F24B 3/00; B62B 1/26
USPC ........................................................ 126/500
See application file for complete search history.

(56) References Cited

U.S. PATENT DOCUMENTS

| | | | |
|---|---|---|---|
| 6,220,240 B1* | 4/2001 | Grady | B62B 5/06 126/276 |
| 6,321,640 B1* | 11/2001 | Tseng | A47J 37/0704 126/25 R |
| 8,079,302 B2* | 12/2011 | Giangrasso | A47J 27/122 126/275 R |
| 2002/0185122 A1* | 12/2002 | Bossler | A47J 37/0704 126/519 |
| 2017/0013999 A1* | 1/2017 | Horsfield | A47J 37/0763 |

* cited by examiner

Primary Examiner — Grant Moubry
Assistant Examiner — Benjamin W Johnson
(74) Attorney, Agent, or Firm — Walter J. Tencza, Jr.

(57) ABSTRACT

An apparatus is provided comprising a first wheelbarrow tray having an inner chamber; a second wheelbarrow tray having an inner chamber; and a means for connecting the first and second wheelbarrow trays, so that the inner chamber of the first wheelbarrow tray and the inner chamber of the second wheelbarrow tray are spaced apart and face each other. The first wheelbarrow tray may have a bottom surface; and the bottom surface of the first wheelbarrow tray may have an opening which is covered by a screen connected to the first wheelbarrow tray. The means for connecting the first wheelbarrow tray to the second wheelbarrow tray may include first, second, third, and four elongated beams. A method is also provided including placing one or more combustible items in an inner chamber of a first wheelbarrow tray of such an apparatus; and causing the one or more combustible items to ignite.

17 Claims, 5 Drawing Sheets

METHOD AND APPARATUS FOR BURNING ITEMS

FIELD OF THE INVENTION

This invention relates to improved methods and apparatus concerning devices for burning wood, refuse, and other objects.

BACKGROUND OF THE INVENTION

There are various devices known for burning refuse.

SUMMARY OF THE INVENTION

In at least one embodiment of the present invention, an apparatus is provided, which includes a first wheelbarrow tray having an inner chamber; a second wheelbarrow tray having an inner chamber; and a means for connecting the first wheelbarrow tray to the second wheelbarrow tray, so that the inner chamber of the first wheelbarrow tray and the inner chamber of the second wheelbarrow tray are spaced apart and face each other. The first wheelbarrow tray may have a top surface; and wherein the top surface of the first wheelbarrow tray may have an opening which is covered by a screen connected to the first wheelbarrow tray. The means for connecting the first wheelbarrow tray to the second wheelbarrow tray include first, second, third, and four elongated beams. The first, second, third, and fourth elongated beams may have substantially the same length as one another.

Each of the first, second, third, and fourth elongated beams may have first ends located nearer to the first wheelbarrow than to the second wheelbarrow and forming a rectangular shape; and each of the first second, third, and fourth elongated beams may have second ends located nearer to the second wheelbarrow than to the first wheelbarrow and forming a rectangular shape. The apparatus may further include first, second, third, and fourth clamps which clamp the first ends of the first, second, third, and fourth elongated beams, respectively, to the first wheelbarrow; and fifth, sixth, seventh, and eighth clamps which clamp the second ends of the first second, third, and fourth elongated beams, respectively, to the second wheelbarrow.

The apparatus may further include a screen attached to the first wheelbarrow, so that the screen is between the first wheelbarrow and the second wheelbarrow and substantially perpendicular to a bottom surface of the first wheelbarrow and a bottom surface of the second wheelbarrow. The screen may be attached so that the screen substantially or completely surrounds an entire periphery of the first wheelbarrow.

In at least one embodiment of the present invention a method is provided which includes placing one or more combustible items in an inner chamber of the second wheelbarrow tray of an apparatus; and causing the one or more combustible items in the inner chamber of the second wheelbarrow tray of the apparatus to ignite; wherein the apparatus may be configured as previously described.

DETAILED DESCRIPTION OF THE DRAWINGS

Figure 1:
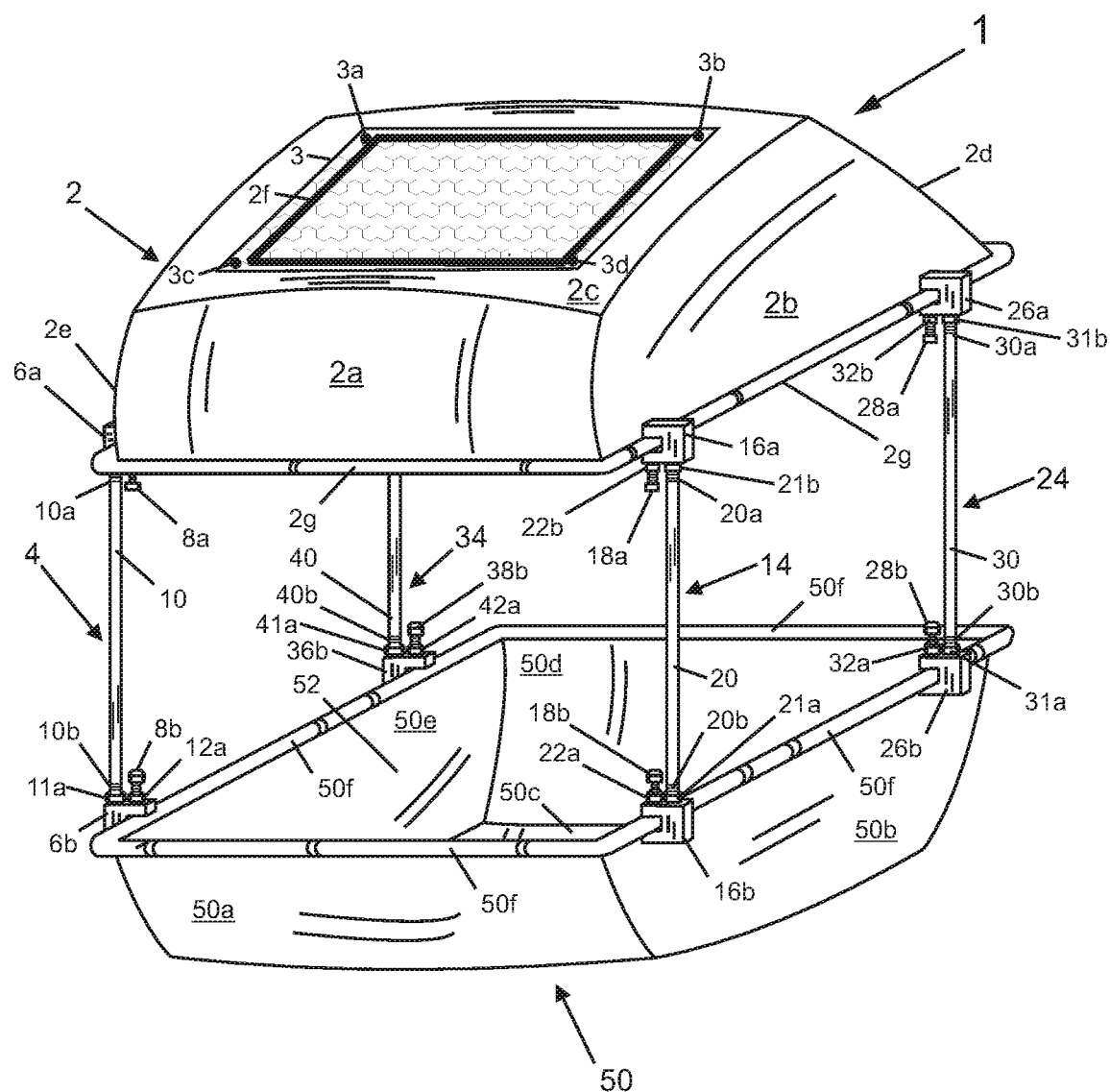
FIG. 1 shows a front, top, and right side perspective view of an apparatus in accordance with an embodiment of the present invention.
Figure 2:
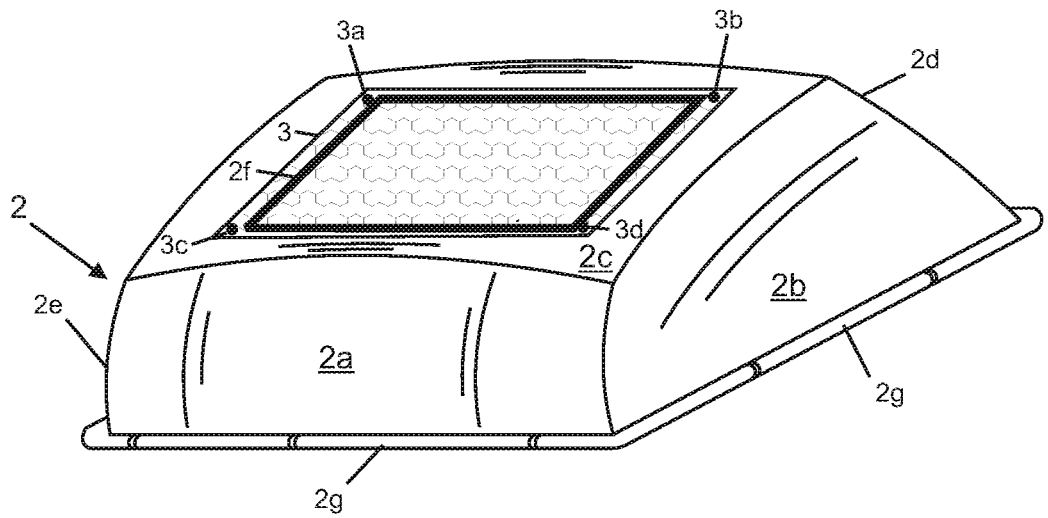
FIG. 2 shows a first device for use with the apparatus of FIG. 1.
Figure 3:
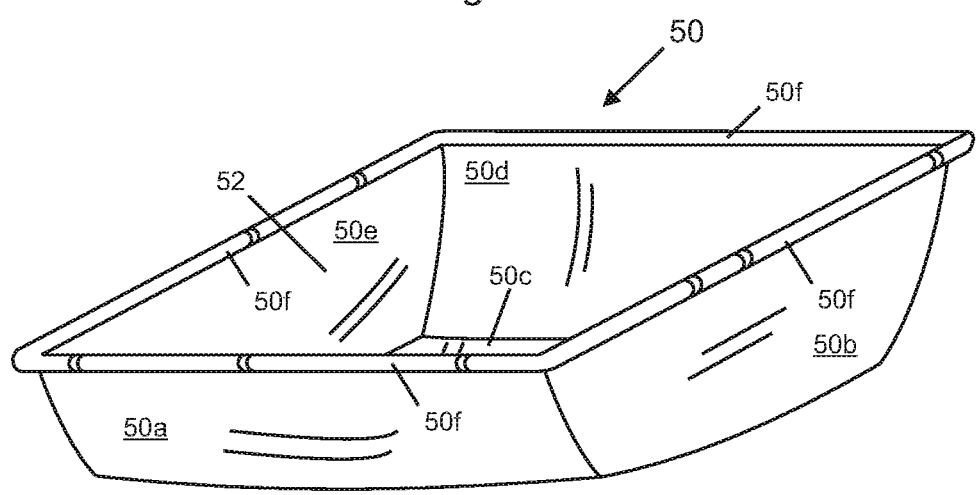
FIG. 3 shows a second device for use with the apparatus of FIG. 1.

FIG. 1 shows a front, top, and right side perspective view of an apparatus 1 in accordance with an embodiment of the present invention. FIG. 2 shows a first device 2 for use with the apparatus 1 of FIG. 1. FIG. 3 shows a second device 50 for use with the apparatus 1 of FIG. 1. Referring to FIG. 1, the apparatus 1 includes the first device 2, connection devices 4, 14, 24, and 34, and the second device 50.

The first device 2 may be a modified wheel barrow tray. The first device 2 may include sides 2a, 2b, 2d and 2e, and a bottom 2c, which enclose an inner chamber, except for an opening 2f (defined by dark outline in FIG. 1). The opening 2f, which may be substantially square or rectangular, may be covered by a screen 3, such as a metal screen having a plurality of uniform openings. Each opening of the screen or mesh 3, have a diameter of about ¼ (one quarter) of an inch. The screen 3 may be made of a hard fire proof metal, such as steel or stainless steel. The first device 2 may have a rim or rolled flange 2g which surrounds the inner chamber of the first device 2, and is located at edges of sides 2a, 2b, 2d, and 2e.

The second device 50 may be a wheel barrow tray. The second devices 50 may include sides 50a, 50b, 50d and 50e, and a bottom 50c, which enclose an inner chamber 52. The second device 50 may have a rim or rolled flange 50f which surrounds the inner chamber 52 of the second device 2, and is located at edges of sides 2a, 2b, 2d, and 2e.

The second device 50 may be made of a hard metal such as steel, such as stainless steel, which is typically used for a wheel barrow. The first device 2 may also be made of a hard metal such as steel or stainless steel which is typically used for a wheel barrow with the exception of screen 3, and fasteners or bolts 3a, 3b, 3c, and 3d which attach the screen 3 to the bottom 2c of the first device 2.

The connection device 4 includes clamp pieces 6a and 6b, bolts 8a and 8b, beam 10, nuts 12a and another nut not shown (but similar or identical to nut 22b), nuts 11a and another nut not shown (but similar or identical to nut 21b). The beam 10 has spiral grooves at ends 10a and 10b. The grooved end 10a is screwed into a first opening of clamp piece 6a, and the grooved end 10b is screwed into a first opening of clamp piece 6b, in FIG. 1, and the beam is held in the position of FIG. 1, in part by nut 11a at the end 10b and a nut similar or identical to nut 21b, at the end 10a. The bolts 8a and 8b are screwed into and through second openings of clamp pieces 6a and 6b respectively, so that they contact rims or flanges 2g (of first device 2) and 50f (of second device 50), in order to hold the connection device 4 in place so that it connects and spaces apart devices 2 and 50.

Similarly or identically, the connection device 14 includes clamp pieces 16a and 16b, bolts 18a and 18b, beam 20, nuts 22a and 22b, and nuts 21a and 21b. The beam 20 has spiral grooves at ends 20a and 20b. The grooved end 20a is screwed into a first opening of clamp piece 16a, and the grooved end 20b is screwed into a first opening of clamp piece 16b, in FIG. 1, and the beam is held in the position of FIG. 1, in part by nut 21a at the end 20b and the nut 21b, at the end 10a. The bolts 18a and 18b are screwed into and through second openings of clamp pieces 16a and 16b respectively, so that they contact rims or flanges 2g (of first device 2) and 50f (of second device 50), in order to hold the connection device 14 in place so that it connects and spaces apart devices 2 and 50.

Similarly or identically, the connection device 24 includes clamp pieces 26a and 26b, bolts 28a and 28b, beam 30, nuts 32a and 32b, and nuts 31a and 31b. The beam 30 has spiral grooves at ends 30a and 30b. The grooved end 30a is screwed into a first opening of clamp piece 26a, and the grooved end 30b is screwed into a first opening of clamp piece 26b, in FIG. 1, and the beam is held in the position of FIG. 1, in part by nut 31a at the end 30b and the nut 31b, at the end 10a. The bolts 28a and 28b are screwed into and through second openings of clamp pieces 26a and 26b respectively, so that they contact rims or flanges 2g (of first device 2) and 50f (of second device 50), in order to hold the connection device 24 in place so that it connects and spaces apart devices 2 and 50.

Similarly or identically, the connection device 34 includes a clamp piece similar or identical to 26a, but not shown and clamp piece 36b, a bolt similar or identical to bolt 28a but not shown and a bolt 38b, beam 40, nuts 42a and a nut similar or identical to nut 32b not shown, and nuts 41a and a nut similar or identical to nut 31b, not shown. The beam 40 has spiral grooves at an end similar or identical to end 30a and end 40b. The grooved end similar or identical to end 30a is screwed into a first opening of a clamp piece similar or identical to clamp piece 26a, and the grooved end 40b is screwed into a first opening of clamp piece 36b, in FIG. 1, and the beam 40 is held in the position of FIG. 1, in part by nut 41a at the end 40b and the nut, at the end opposite end, similar or identical to end 30a. The bolt similar or identical to bolt 28a and the bolt 38b are screwed into and through second openings of a clamp piece similar or identical to clamp piece 26a and clamp piece 36b respectively, so that they contact rims or flanges 2g (of first device 2) and 50f (of second device 50), in order to hold the connection device 34 in place so that it connects and spaces apart devices 2 and 50.

The beams 10, 20, 30, and 40 may provide a uniform eighteen inch distance or gap between the flange or rim 50f and the flange or rim 2g. A uniform distance or gap is preferred.

The beams 10, 20, 30, and 40 may be made of a solid metal, which is non flammable or fire resistant such as steel, such as stainless steel. All of the components of the devices 4, 14, 24, and 34 should be made of a solid metal which is non flammable, or fire resistant, such as steel, such as stainless steel.

Figure 4:
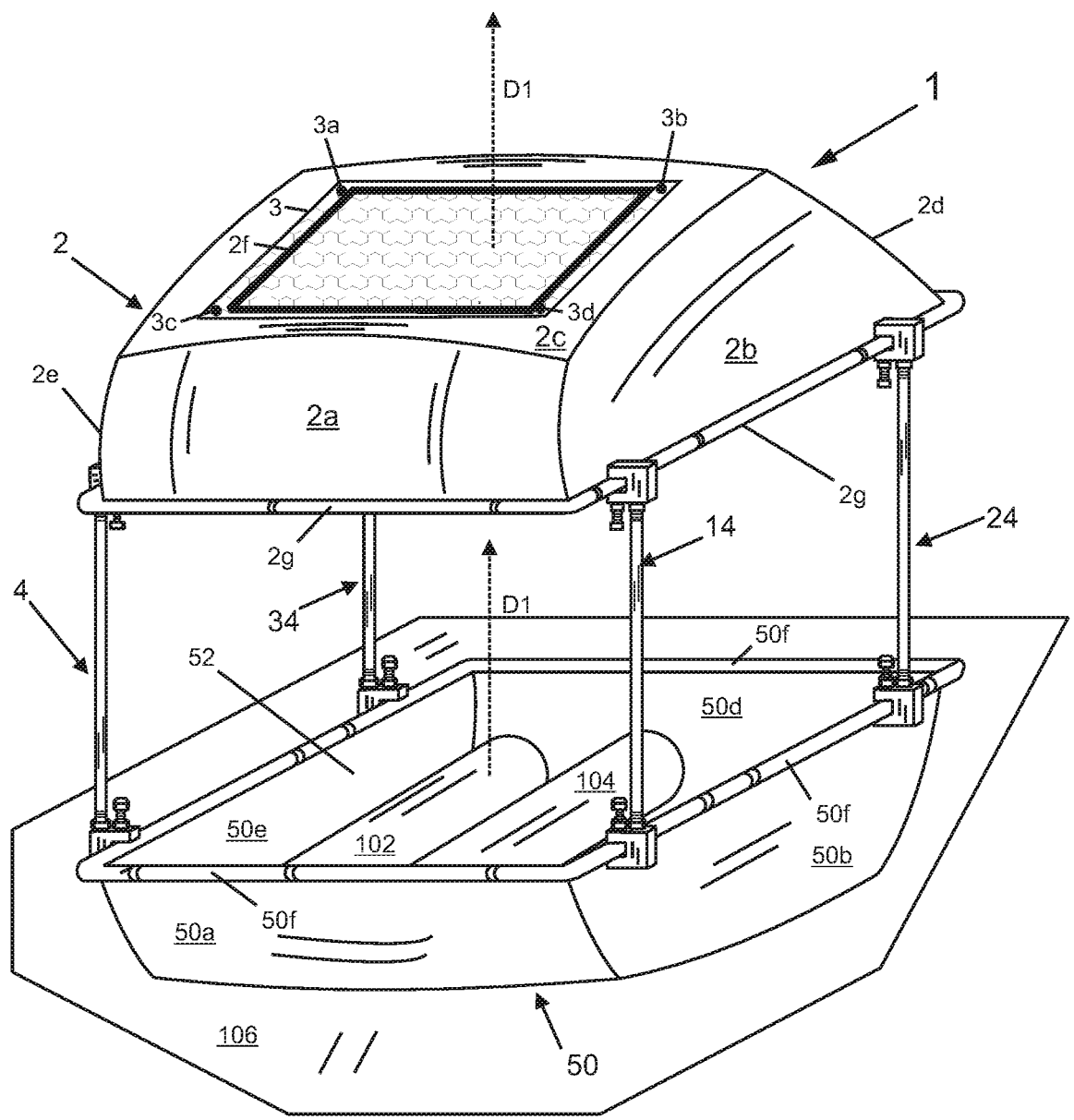
FIG. 4 shows a front, top, and right side perspective view of the apparatus of FIG. 1 along with two logs shown placed in an inner chamber of the second device of FIG. 3.

FIG. 4 shows a front, top, and right side perspective view of the apparatus 1 of FIG. 1 along with wood logs 102 and 104 shown placed in an inner chamber 52 of the second device 50. The apparatus 1 has been placed on a flat ground surface 106. The flat ground surface 106 may be a grass lawn or can be concrete or pavement.

In operation, an individual may place items, such as logs or refuse into inner chamber 52 of the apparatus 1, as shown in FIG. 4. The individual may light these items on fire. The smoke and/or flames from the burning items, goes up in the direction D1, shown in FIG. 4, from the inner chamber 52 of the second device 50, up through the gap between the first device 2 and the second device 50, up through the inner chamber of the first device 2, and then out through the opening 2f and through the openings of the screen 3.

Figure 5:
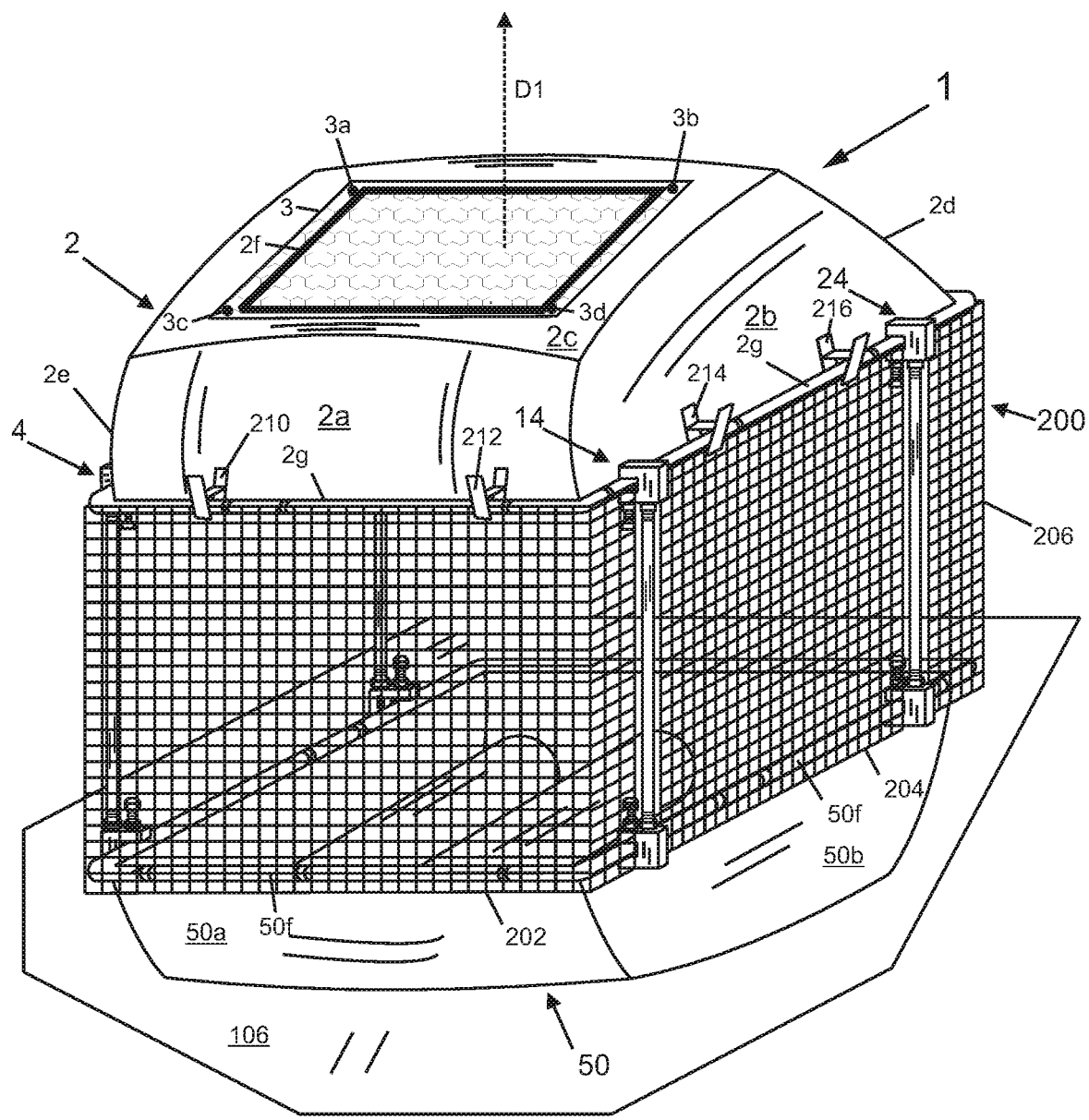
FIG. 5 shows a front, top, and right side perspective view of the apparatus of FIG. 1 along with the two logs shown placed in an inner chamber of the second device of FIG. 3, and along with screening attached, which screens the region between the first device and the second device.

FIG. 5 shows a front, top, and right side perspective view of the apparatus 1 of FIG. 1 along with the two logs 102 and 104 shown placed in the inner chamber 52 of the second device 50, and along with screening 200 attached, which screens the region between the first device 2 and the second device 50. The screening 200 may be made, entirely or substantially, of a non flammable metal.

The screening 200 may include a portion 202, which is attached by clips 210 and 212 to flange or rim 2g. The portion 202 is generally a square region of screen or screening with curved edges near devices 4 and 14, whose area is substantially defined or entirely defined by the shortest portion of flange 2g which has ends of devices 4 and 14 (i.e. doesn't include devices 24 and 34), the shortest portion of flange 50f which has ends of devices 4 and 14 (i.e. doesn't include devices 24 and 34), and by beams or members 10 and 20.

Similarly, or identically, the screening 200 may include a portion 204, which is attached by clips 214 and 216 to flange or rim 2g. The portion 204 is generally a square region of screen, whose area is substantially defined or entirely defined by the shortest portion of flange 2g which has ends of devices 14 and 24, the shortest portion of flange 50f which has ends of devices 14 and 24, and by beams or members 20 and 30.

Similarly or identically, the screen 200 may include a portion, not shown in FIG. 5, which is similar or identical to portion 202, which is attached by clips, similar or identical to clips 210 and 212 to flange or rim 2g, which is generally a square region of screen or screening with curved edges near devices 24 and 34, whose area is substantially defined or entirely defined by the shortest portion of flange 2g which has ends of devices 24 and 34 (i.e. doesn't include devices 4 and 14), the shortest portion of flange 50f which has ends of devices 24 and 34 (i.e. doesn't include devices 24 and 34), and by beams or members 30 and 40.

Similarly or identically, the screen 200 may include a portion, not shown in FIG. 5, which is similar or identical to portion 204, which is attached by clips, similar or identical to clips 214 and 216 to flange or rim 2g, which is generally a square region of screen or screening, whose area is substantially defined or entirely defined by the shortest portion of flange 2g which has ends of devices 4 and 34 (i.e. doesn't include devices 14 and 24), the shortest portion of flange 50f which has ends of devices 4 and 34 (i.e. doesn't include devices 14 and 24), and by beams or members 10 and 40.

The screening or screen 3 may be of the same structure and material, such as, for example, a grid metal screen, as the screen or screening 200.

The screen or screening 200 may be removably attached to the flange 2g by the use of clips 210, 212, 214, 216, and one or more further clips, such as attached between devices 4 and 34, and between devices 24 and 34, not shown.

The screen or screening 200 may be the same type of material as used for known fireplace screens.

Figure 6:
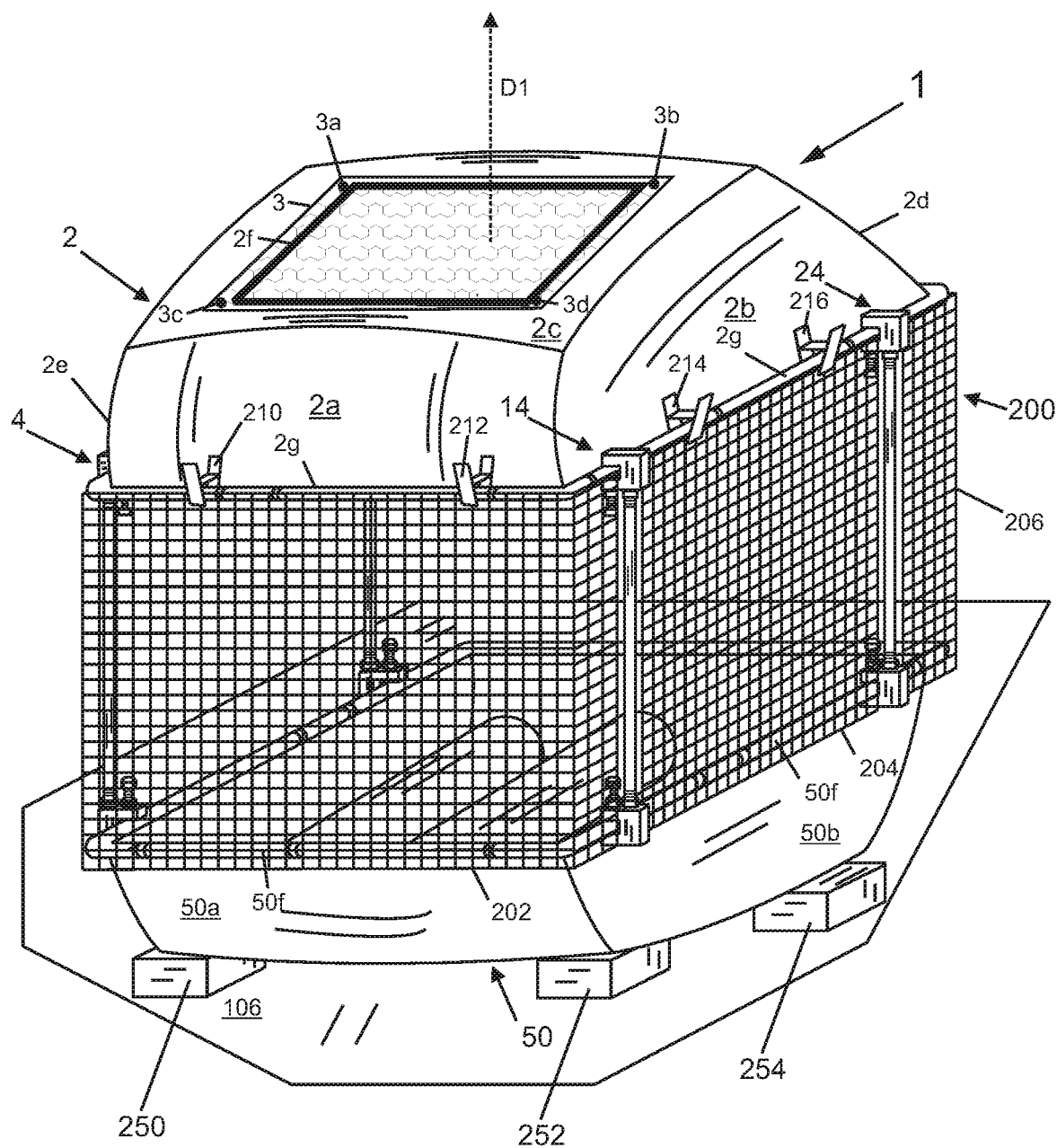
FIG. 6 shows a front, top, and right side perspective view of the apparatus of FIG. 1 along with the two logs shown placed in an inner chamber of the second device of FIG. 3, along with screening attached, which screens the region between the first device and the second device, and wherein the second device 50 is shown placed on one or more supports.

FIG. 6 shows a front, top, and right side perspective view of the apparatus 1 of FIG. 1 along with the two logs 102 and 104 shown placed in an inner chamber 52 of the second device 50 of FIG. 3, along with screening 200 attached, which screens the region between the first device 2 and the second device 50, and wherein the second device 50 is shown placed on one or more supports 250, 252, and 254, and one or more further supports not shown. There typically would be at least four supports, which may define vertices of a rectangular shape. Each of the supports 250, 252, and 254, may be a brick or a stone, or other non flammable rigid support structure.

The screen 3 or spark screen may be changed to a larger version.

In at least one embodiment, there will also be a removable plate mounted in the front of the upper tray so you can see the flame-light through a logo that will be cut into the plate.

The base supports 250, 252, and 254, and any further base supports are constructed so that they are able to stop heat from traveling down to the ground surface 106, which could harm or set fire to a deck, or grass on the ground surface 106 in FIG. 6.

The screening 200, or spark arrester surrounding screen 200 may be made of hanging chain, chain mail, other material suited for high temp.

The second device 50 may hold firewood, such as logs 102 and 104 in inner chamber 52, as the logs 102 and 104 burn.

There may be an optional grill kit provided to cook, grill, or bake food, where would it be placed, show in pen marked up drawing.

A gas (natural/propane) kit may be provided with the apparatus 1.

The apparatus 1 and screening 200 may be used as a smoke box, to smoke meats.

The apparatus 1 and screening 200 may be used as a box with stone to cook pizza.

The beams, members or support columns 10, 20, 30, and 40 may be of different material and they may be attached or adhered to devices or trays 2 and 50 in various known ways. There can be more or less members or support columns.

An average wheelbarrow tray, such as preferably used for trays or devices 2 and 50, is heavy duty sixteen gauge (on average) high grade steel so apparatus 1 will last for many years.

The screen 3 is typically fixed, such as by screws, to upper tray 2 to provide safety. The screening 200 can be more easily removed such as by detachable clips, or may be able to be slid similar to a fire place screening or screening.

In one or more embodiments, a method provided, includes placing one or more combustible items in an inner chamber 52 of the wheelbarrow tray 50 of such an apparatus; and causing the one or more combustible items to ignite for which safety is provided by the utilization of the permanent spark arrestor screen 3 fastened to the top of the wheelbarrow tray 2 and spark arrestor screening 200 surrounding the wheelbarrow fire pit and/or inner chamber 52. The method to fasten the spark arrestor screening 200 surrounding the wheelbarrow fire pit and/or inner chamber 52 can change depending on configuration. The spark arrestor screen 3 on top of wheelbarrow tray 2 can be modified regarding, material, shape and size of screen and its surface area coverage depending on configuration.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a first wheelbarrow tray having an inner chamber and a peripheral flange which surrounds the inner chamber of the first wheelbarrow tray;
a second wheelbarrow tray having an inner chamber and a peripheral flange which surrounds the inner chamber of the second wheelbarrow tray;
a means for connecting the first wheelbarrow tray to the second wheelbarrow tray, so that the inner chamber of the first wheelbarrow tray and the inner chamber of the second wheelbarrow tray are spaced apart and face each other, wherein the means for connecting the first wheelbarrow tray to the second wheelbarrow tray includes first, second, third, and fourth elongated beams that each include a first end and an opposite second end;
first, second, third, and fourth clamps which clamp the first end of the first, second, third, and fourth elongated beams, respectively, to the first wheelbarrow tray, wherein each of the first, second third and fourth clamps have an opening that a portion of the peripheral flange of the first wheelbarrow tray is configured to fit into; and
fifth, sixth, seventh, and eighth clamps which clamp the second end of the first second, third, and fourth elongated beams, respectively, to the second wheelbarrow tray, wherein each of the fifth, sixth, seventh and eighth clamps have an opening that a portion of the peripheral flange of the second wheelbarrow tray is configured to fit into;
wherein the first wheelbarrow tray and the second wheelbarrow tray are fixed in position and orientation with respect to each other, and are spaced apart from each other, by the means for connecting the first wheelbarrow tray to the second wheelbarrow tray and by each clamp.

2. The apparatus of claim 1 wherein
the first wheelbarrow tray has a bottom surface; and
wherein the bottom surface of the first wheelbarrow tray has an opening which is covered by a screen connected to the first wheelbarrow tray; and wherein
the screen is configured to permit smoke and flames from logs placed in the inner chamber of the second wheelbarrow tray to go up from the inner chamber of the second wheelbarrow tray, up through a gap between the first wheelbarrow tray and the second wheelbarrow tray, up through the inner chamber of the first wheelbarrow tray, and then up and out through the opening of the bottom surface of the first wheelbarrow tray.

3. The apparatus of claim 1 wherein the first, second, third, and fourth elongated beams have substantially the same length as one another.

4. The apparatus of claim 1 wherein the first ends of the first, second, third, and fourth elongated beams together form a rectangular shape; and wherein the second ends of the first; second, third, and fourth elongated beams together form a rectangular shape.

5. The apparatus of claim 1 further comprising
a screen attached to the first wheelbarrow tray, so that the screen is between the first wheelbarrow tray and the second wheelbarrow tray and substantially perpendicular to a bottom surface of the first wheelbarrow tray and a bottom surface of the second wheelbarrow tray.

6. The apparatus of claim 5 wherein
the screen is attached so that the screen substantially surrounds an entire periphery of the first wheelbarrow tray.

7. The apparatus of claim 2 wherein the screen is made of a hard fire proof metal; and wherein the screen has a mesh including a plurality of openings each having a diameter of about one quarter of an inch.

8. A method comprising
placing one or more combustible items in an inner chamber of a first wheelbarrow tray of an apparatus;
causing the one or more combustible items in the inner chamber of the first wheelbarrow tray of the apparatus to ignite;
wherein the apparatus comprises:
the first wheelbarrow tray, wherein the first wheelbarrow tray has an inner chamber and a peripheral flange which surrounds the inner chamber of the first wheelbarrow tray;
a second wheelbarrow tray having an inner chamber and a peripheral flange which surrounds the inner chamber of the second wheelbarrow tray;
a means for connecting the first wheelbarrow tray to the second wheelbarrow tray, so that the inner chamber of the first wheelbarrow tray and the inner chamber of the second wheelbarrow tray are spaced apart and face each other, wherein the means for connecting the first wheelbarrow tray to the second wheelbarrow tray includes first, second, third, and fourth elongated beams that each include a first end and an opposite second end;
first, second, third, and fourth clamps which clamp the first end of the first, second, third, and fourth elongated beams, respectively, to the first wheelbarrow tray, wherein each of the first, second third and fourth clamps have an opening that a portion of the peripheral flange of the first wheelbarrow tray is configured to fit into; and
fifth, sixth, seventh, and eighth clamps which clamp the second end of the first, second, third, and fourth elongated beams, respectively, to the second wheelbarrow tray, wherein each of the fifth, sixth, seventh and eighth clamps have an opening that a portion of the peripheral flange of the second wheelbarrow tray is configured to fit into;
wherein the first wheelbarrow tray and the second wheelbarrow tray are fixed in position and orientation with respect to each other, and are spaced apart from each other, by the means for connecting the first wheelbarrow tray to the second wheelbarrow tray and by each clamp; and
wherein the peripheral flange of the first wheelbarrow tray has the same structure as the peripheral flange of the second wheelbarrow tray.

9. The method of claim 8 wherein the first wheelbarrow tray has an opening in a bottom surface of the first wheelbarrow tray and the opening is covered by a screen connected to the first wheelbarrow tray; and wherein the screen is configured to permit smoke and flames from logs placed in the inner chamber of the second wheelbarrow tray to go up from the inner chamber of the second wheelbarrow tray, up through a gap between the first wheelbarrow tray and the second wheelbarrow tray, up through the inner chamber of the first wheelbarrow tray, and then up and out through the opening of the bottom surface of the first wheelbarrow tray.

10. The method of claim 8 wherein the first, second, third, and fourth elongated beams have substantially the same length as one another.

11. The method of claim 8 wherein
the apparatus further includes a screen attached to the first wheelbarrow tray, so that the screen is between the first wheelbarrow tray and the second wheelbarrow tray and substantially perpendicular to a bottom surface of the first wheelbarrow tray and a bottom surface of the second wheelbarrow tray.

12. The method of claim 11 wherein
the screen is attached so that the screen substantially surrounds an entire periphery of the first wheelbarrow tray.

13. The apparatus of claim 1 wherein the apparatus further comprises a screen attached to the first wheelbarrow tray, so that the screen is between the first wheelbarrow tray and the second wheelbarrow tray and substantially perpendicular to a bottom surface of the first wheelbarrow tray and a bottom surface of the second wheelbarrow tray;
wherein the screen is attached so that the screen substantially surrounds an entire periphery of the first wheelbarrow tray; and
wherein the screen k configured to be detached from the first wheelbarrow tray while the first wheelbarrow tray k connected to the second wheelbarrow tray, and while the first wheelbarrow tray k fixed in position and orientation with respect to the second wheelbarrow tray.

14. The apparatus of claim 1
wherein the peripheral flange of the first wheelbarrow tray has the same structure as the peripheral flange of the second wheelbarrow tray.

15. The method of claim 8 wherein
the second wheelbarrow tray is of a first type of wheelbarrow tray; and
the first wheelbarrow tray is a modification of the first type of wheelbarrow tray.

16. The method of claim 15 wherein
the first wheelbarrow tray is modified by forming an opening in a bottom surface of the first type of wheelbarrow tray to form the first wheelbarrow tray, so that smoke and flames from logs placed in the inner chamber of the second wheelbarrow tray go up from the inner chamber of the second wheelbarrow tray, through a gap between the first wheelbarrow tray and the second wheelbarrow tray, through the inner chamber of the first wheelbarrow tray, and then out through the opening in the bottom surface of the first wheelbarrow tray.

17. The method of claim 9 wherein
the screen is made of a hard fire proof metal; and
wherein the screen has a mesh including a plurality of openings each having a diameter of about one quarter of an inch.

* * * * *